W. G. PERRIS.
Printer's Measuring-Scale.

No. 204,601. Patented June 4, 1878.

Fig. 1. Fig. 2.

Inventor
Wm G Perris
by his attys.
Van Santvoord & Hauff

Witnesses.
Chas Wahlers
Hugo Brueggmann

UNITED STATES PATENT OFFICE.

WILLIAM G. PERRIS, OF NEW YORK, N. Y.

IMPROVEMENT IN PRINTERS' MEASURING-SCALES.

Specification forming part of Letters Patent No. 204,601, dated June 4, 1878; application filed May 10, 1878.

*To all whom it may concern:*

Be it known that I, WILLIAM G. PERRIS, of the city, county, and State of New York, have invented a new and useful Improvement in Printers' Scales, which improvement is fully set forth in the following specification, reference being had to the accompanying drawings, in which—

Figure 1 shows the obverse side of my scale. Fig. 2 shows the reverse side thereof.

Similar letters indicate corresponding parts.

My invention relates to scales for measuring type or matter by printers.

The device now generally used for this purpose consists of a square wooden rod, on each of whose edges is marked a graduated scale representing a certain kind of type. This scale is expensive, and, moreover, needs to be repeatedly turned over in order to bring different of its scales in a position for use.

The object of my invention is to produce a scale which is not only cheaper, but which can be more easily handled, than the one now in use.

To this end it consists in a slotted strip of card-board or other suitable material, bearing on its edges and on the edges of its slots graduated scales adapted for measuring type or matter, the strip being also provided with a ruling-scale on one of its edges, as hereinafter more fully set forth.

In the drawings, the letter A designates the body of my scale, which, for cheapness, I prefer to make of a strip of pasteboard, but which can also be made of a strip of flat metal, ivory, or any other suitable material; and B are two (more or less) slots formed in the strip A.

$a, b, c, d$, &c., are graduated scales marked on the edges of the slots. These scales $a, b, c, d$, &c., are marked on both sides of the strip A, and in the example shown the scales $a$ to $j$, inclusive, are composed simply of numerals, the sizes of which are increased on the successive scales, each of such scales representing a certain kind of type, the name of which is marked at one end of the scales, as shown.

The scale $k$ is intended for exhibiting different kinds of ruling, and is composed of a series of spaces or divisions, each marked with a certain numeral, and each subdivided by lines which are situated at different distances apart in each division, while the scale $l$ represents an ordinary foot-rule.

By the scales $a$ to $j$ my device is adapted to be used either for measuring the number of "ems" contained in a body of printed matter, for calculating the amount of type needed to fill a certain space, or for ascertaining the number of lines of any certain kind of type which can be brought in a given space—that is to say, in order to estimate the number of "ems" in a body of type or matter set up, I ascertain by the appropriate scale (as, for instance, by the scale $h$ for "long primer") the number of solid ems contained in the length of the body, and multiply that number by the number contained in the width, and in a corresponding manner calculate the amount of type needed to fill a certain space.

In order to ascertain the number of lines which can be brought on a page or in a column of given size, I simply place my scale on the selected spot and measure by the desired scale.

The object of the ruling-scale $k$ is to show different kinds of ruling, and to permit of learning from a customer the kind of ruling desired on any article, so that in sending the paper to be ruled, which is usually done outside of a printing-office, it is only necessary, in order to state the kind of ruling desired, to give the number on the scale.

I utilize one of the edges or ends of the strips A by marking on such edge lines representing the columns of a bill-head or other similar article.

What I claim as new, and desire to secure by Letters Patent, is—

1. A printer's scale composed of a slotted strip of card-board or other suitable material, bearing on its edges and on the edges of its slots graduated scales $a\ b\ c\ d\ e f\ g\ h\ i\ j$, adapted for measuring type or matter, substantially as hereinbefore set forth.

2. A printer's scale composed of a slotted strip of card-board or other suitable material, bearing on its edges and on the edges of its slots graduated scales $a\ b\ c\ d\ e f\ g\ h\ i\ j$, adapted for measuring type or matter, and a ruling-scale, $k$, substantially as and for the purpose described.

In testimony that I claim the foregoing I have hereunto set my hand this 2d day of May, 1878.

WILLIAM G. PERRIS.

Witnesses:
 E. F. KASTENHUBER,
 HENRY H. BROWN.